(12) United States Patent
Nam et al.

(10) Patent No.: US 11,731,262 B2
(45) Date of Patent: Aug. 22, 2023

(54) ROBOT AND METHOD FOR OPERATING THE SAME

(71) Applicant: SAMSUNG ELECTRONICS CO., LTD., Suwon-si (KR)

(72) Inventors: Seonah Nam, Suwon-si (KR); Myeongsang Yu, Suwon-si (KR); Yusun Lee, Suwon-si (KR); Jiyeon Lee, Suwon-si (KR); Dain Chung, Suwon-si (KR); Jangwon Lee, Suwon-si (KR); Jinsung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/510,366

(22) Filed: Oct. 25, 2021

(65) Prior Publication Data
US 2022/0410368 A1 Dec. 29, 2022

Related U.S. Application Data

(63) Continuation of application No. PCT/KR2021/014100, filed on Oct. 13, 2021.

(30) Foreign Application Priority Data

Jun. 28, 2021 (KR) ........................ 10-2021-0083874

(51) Int. Cl.
*B25J 11/00* (2006.01)
*B25J 9/00* (2006.01)
*G05B 19/4155* (2006.01)

(52) U.S. Cl.
CPC ......... *B25J 9/0003* (2013.01); *B25J 11/0005* (2013.01); *B25J 11/008* (2013.01); *G05B 19/4155* (2013.01); *G05B 2219/50391* (2013.01)

(58) Field of Classification Search
None
See application file for complete search history.

(56) References Cited

U.S. PATENT DOCUMENTS

2002/0158599 A1   10/2002   Fujita et al.
2003/0187653 A1   10/2003   Okubo et al.
(Continued)

FOREIGN PATENT DOCUMENTS

JP   2003-308142 A   10/2003
JP   6625266 B1      12/2019
(Continued)

OTHER PUBLICATIONS

Zhang et al., Control architecture and experiment of a situated robot system for interactive assembly, 2002, IEEE, p. 3906-3911 (Year: 2002).*

(Continued)

*Primary Examiner* — McDieunel Marc
(74) *Attorney, Agent, or Firm* — Sughrue Mion, PLLC

(57) ABSTRACT

A robot includes at least one motor driving the robot to perform a predetermined motion; a memory storing a motion map database and a program comprising one or more instructions; and at least one processor electrically connected to the at least one motor and the memory, the at least one processor being configured to: obtain an input motion identifier based on a user input, identify a motion state indicating whether the robot is performing a motion, based on the motion state being in an active state, store the input motion identifier in the memory, and based on the motion state being in an idle state: determine an active motion identifier from at least one motion identifier stored in the memory based on a predetermined criterion; and control the at least one motor to drive a motion corresponding to the active motion identifier based on the motion map database.

20 Claims, 9 Drawing Sheets

(56) References Cited

U.S. PATENT DOCUMENTS

| | | |
|---|---|---|
| 2012/0268580 A1 | 10/2012 | Kim et al. |
| 2015/0100157 A1 | 4/2015 | Houssin et al. |
| 2019/0107833 A1 | 4/2019 | Song et al. |
| 2020/0254358 A1 | 8/2020 | Kim et al. |

FOREIGN PATENT DOCUMENTS

| | | |
|---|---|---|
| JP | 7147167 B2 | 9/2022 |
| JP | 2022-187852 A | 12/2022 |
| KR | 10-2003-0073408 A | 9/2003 |
| KR | 10-0396754 B1 | 9/2003 |
| KR | 10-0498061 B1 | 6/2005 |
| KR | 10-2011-0041648 A | 4/2011 |
| KR | 10-1191978 B1 | 10/2012 |
| KR | 10-2038016 B1 | 10/2019 |
| KR | 10-2301763 B1 | 9/2021 |
| KR | 10-2370873 B1 | 3/2022 |
| WO | 2017/033366 A1 | 3/2017 |

OTHER PUBLICATIONS

Chersi et al., Learning Through Imitation: a Biological Approach to Robotics, 2012, IEEE, p. 204-214 (Year: 2012).*
Sacks et al., RoboX: An End-to-End Solution to Accelerate Autonomous Control in Robotics, 2018, IEEE, p. 479-490 (Year: 2018).*
Zhang et al., A two-arm situated artificial communicator for human-robot cooperative assembly, 2003, IEEE, p. 651-658 (Year: 2003).*
Communication dated Mar. 24, 2022, issued by the International Searching Authority in counterpart International Application No. PCT/KR2021/014100 (PCT/ISA/210)

* cited by examiner

ROBOT AND METHOD FOR OPERATING THE SAME

CROSS-REFERENCE TO RELATED APPLICATION(S)

This application is a bypass continuation application of International Application PCT/KR2021/014100 filed on Oct. 13, 2021, which claims priority to Korean Patent Application No. 10-2021-0083874, filed on Jun. 28, 2021, in the Korean Intellectual Property Office, the disclosures of which are incorporated herein in their entireties by reference.

TECHNICAL FIELD

Various embodiments of the disclosure relate to a robot for controlling motion input processing in consideration of a motion state of the robot and a driving method thereof.

BACKGROUND ART

People extensively interact with each other through networked electronic devices. As robot technology develops along with expansion of the application fields of robots, home robots that may be used in common homes are being manufactured, in addition to e.g., high-tech medical robots and aerospace robots. Accordingly, it is possible for a user of an electronic device such as e.g., a smartphone to communicate in real time with another person, using a networked robot. For example, a robot called a 'telepresence robot' (or a remote presence robot or a virtual presence robot) is a robot that can be generally remote-controlled via an electronic device such as a smartphone, by which a user of the electronic device can perform both video and voice communications with a robot user.

DISCLOSURE

Technical Problem

If the robot provides motions corresponding to video/voice in addition to video/voice communications, one can further enhance the interactive experience between users, such as e.g., vividness, friendly feeling, and fun. In this instance, it has to process a motion input based on a user input such as e.g., video, voice, or the like, in line with the motion driven by the robot.

Various embodiments of the disclosure provide a robot capable of adjusting motion input processing in consideration of whether a motion state of the robot is an active state or an idle state, when the robot drives a motion corresponding to a user input, and a driving method thereof.

Technical Solution

According to an aspect the disclosure, a robot may include at least one motor driving the robot to perform a predetermined motion; a memory storing a motion map database and a program comprising one or more instructions; and at least one processor electrically connected to the at least one motor and the memory, the at least one processor being configured to execute the one or more instructions of the program stored in the memory to: obtain an input motion identifier based on a user input, identify a motion state indicating whether the robot is performing a motion, based on the motion state being in an active state, store the input motion identifier in the memory, and based on the motion state being in an idle state: determine an active motion identifier from at least one motion identifier stored in the memory based on a predetermined criterion; and control the at least one motor to drive a motion corresponding to the active motion identifier based on the motion map database.

The predetermined criterion may correspond to one of a motion identifier set based on an external input, a most obtained motion identifier, or a most recently stored motion identifier.

The robot may include one or more of: a communication interface configured to receive the input motion identifier from an electronic device; or an input/output interface configured to obtain the user input. The user input may include voice, text, image, emoticon and gesture.

The motion map database may include at least one record corresponding to each motion drivable by the at least one motor, and the at least one record may include at least one motion identifier and at least one set of motor values for each motion timeframe of each of the at least one motion identifier.

The at least one motor may be configured to drive the motion at a motion speed corresponding to one of acceleration, constant velocity, or deceleration in each motion timeframe, based on at least one set of motor values for each motion timeframe that are obtained using the active motion identifier from the motion map database; and the at least one processor is configured to store the input motion identifier in the memory, based on the at least one motor being driven at a predetermined motion speed.

The robot may further include an input/output interface configured to obtain a user input for setting a motion of the robot and a character string corresponding to the set motion. The at least one processor may be further configured to execute the one or more instructions of the program stored in the memory to: obtain a candidate motion identifier based on the character string, obtain at least one set of motor values for each motion timeframe, corresponding to the set motion, and store a record in the motion map database, wherein the record comprises the candidate motion identifier and the at least one set of motor values for each motion timeframe.

According to another aspect of the disclosure, an electronic device may include an input/output interface configured to obtain a user input; a communication interface configured to receive a motion state corresponding to either one of an active state or an idle state from a robot; a memory storing a program comprising one or more instructions; and at least one processor electrically connected to the input/output interface, the communication interface, and the memory, the at least one processor may be configured to execute the one or more instructions of the program stored in the memory to: obtain an input motion identifier based on the user input, based on the motion state being in the active state, store the input motion identifier in the memory; and based on the motion state being in the idle state: determine an active motion identifier from at least one motion identifier stored in the memory based on a predetermined criterion; and transmit the active motion identifier to the robot using the communication interface.

The predetermined criterion may corresponds to one of a motion identifier set based on an external input, a most obtained motion identifier, or a most recently stored motion identifier.

According to yet another aspect of the disclosure, a method of driving a robot may include obtaining an input motion identifier based on a user input; identifying a motion state indicating whether the robot is in an active state or an idle state; based on the motion state being in the active state, storing the input motion identifier; and based on the motion state being in the idle state: determining an active motion identifier from at least one stored motion identifier based on a predetermined criterion; and driving a motion corresponding to the active motion identifier based on a motion map database.

The predetermined criterion may correspond to one of a motion identifier set based on an external input, a most obtained motion identifier, or a most recently stored motion identifier.

The obtaining the input motion identifier based on the user input may include one of receiving the determined motion identifier based on the user input from an electronic device or obtaining the user input using an input/output interface; and the user input may include voice, text, image, emoticon and gesture.

The motion map database may include at least one record corresponding to each motion drivable by the at least one motor, wherein the at least one record comprises at least one motion identifier and at least one set of motor values for each motion timeframe of each of the at least one motion identifier.

The driving the motion corresponding to the active motion identifier may be an operation to drive the motion at a motion speed corresponding to one of acceleration, constant velocity, or deceleration in each of motion timeframes, based on at least one set of motor values for each of motion timeframes of the motion; and the storing the input motion identifier is an operation to store the input motion identifier, based on the motion being driven at a predetermined motion speed.

The method may further include obtaining a user input for setting a motion of the robot; obtaining a character string corresponding to the set motion; obtaining a candidate motion identifier based on the character string; obtaining at least one set of motor values for each motion timeframe corresponding to the set motion; and storing a record in the motion map database, wherein the record comprises the candidate motion identifier and the at least one set of motor values for each motion timeframe.

According to another aspect of the disclosure, a method of operating an electronic device may include receiving from a robot a motion state indicating one of an active state or an idle state; obtaining an input motion identifier based on a user input; based on the motion state being in the active state, storing the input motion identifier; and based on the motion state being in the idle state: determining an active motion identifier from at least one stored motion identifier based on a predetermined criterion; and transmitting the active motion identifier to the robot.

The predetermined criterion may correspond to one of a motion identifier set based on an external input, a most obtained motion identifier, or a most recently stored motion identifier.

According to yet another aspect of the disclosure, a robot may include at least one motor driving the robot to perform one or more a motions; a memory storing a program comprising one or more instructions; an input/output interface configured to output text and voice; and at least one processor electrically connected to the at least one motor and the memory, the at least one processor being configured to execute the one or more instructions of the program stored in the memory to: obtain a user input from a user, the user input comprising one or more of text and voice; obtain a plurality of motion identifiers based on the one or more of the text or voice; obtain a plurality of motions corresponding to the plurality of motion identifiers; control the input/output interface to output the one or more of the text and voice; and control the at least one motor to drive the robot to perform one or more of the plurality of motions as text or voice of a corresponding motion is output by the input/output interface.

The at least one processor may be further configured to: determine whether the robot is in an active state or an idle state; based on the robot being in the active state when text or voice of a first motion is output, skip the first motion; and based on the robot being in the idle state when text or voice of the first motion is output, control the at least one motor to drive the robot to perform the first motion.

The at least one processor may be further configured to: determine whether the robot is in an active state or an idle state; based on the robot being in the active state when text or voice of a first motion is output, store the first motion in the memory; and based on the robot being in the idle state when text or voice of the first motion is output, control the at least one motor to drive the robot to perform a first stored motion.

The first stored motion may be selected based on a predetermined criterion, and the predetermined criterion may correspond to one of a motion identifier set based on an external input, a most obtained motion identifier, or a most recently stored motion identifier.

Advantageous Effects

According to various embodiments of the disclosure, it is possible to further enhance the user experience such as e.g., vividness, friendly feeling, concentration, fun, learning effect and so on, enabling a robot to provide a motion corresponding to a user input such as e.g., voice, texts, images, emoticons and gestures. Further, providing a motion corresponding to the user input in the robot makes it possible to further facilitate communications between its users through the robot.

Furthermore, according to various embodiments of the disclosure, a robot can drive a motion corresponding to a motion identifier obtained based on a user input, so that when the robot is in an active motion state, the obtained motion identifier is stored, and when the robot is in an idle motion state, the motion identifier is determined based on a predetermined criterion from at least one stored motion identifier to perform the motion input, thereby allowing the motion input processing to be controlled in consideration of the robot's motion state. Accordingly, even when a motion input speed is faster than a motion driving speed by the robot, any possible errors caused by the collision of the motion driving in the robot can be avoided in advance, and the users can obtain more natural user experience as if a human performs such a motion.

Effects that one may obtain from exemplary embodiments of the disclosure are not limited to the above-mentioned effects, and any other effects not mentioned herein may be clearly derived and understood from the following description by those having ordinary knowledge in the art to which the exemplary embodiments of the disclosure pertain. In other words, any unexpected effects according to implementing the exemplary embodiments of the disclosure may be also derived by an expert skilled in the art from the exemplary embodiments of the disclosure.

MODE OF INVENTION

Figure 1:
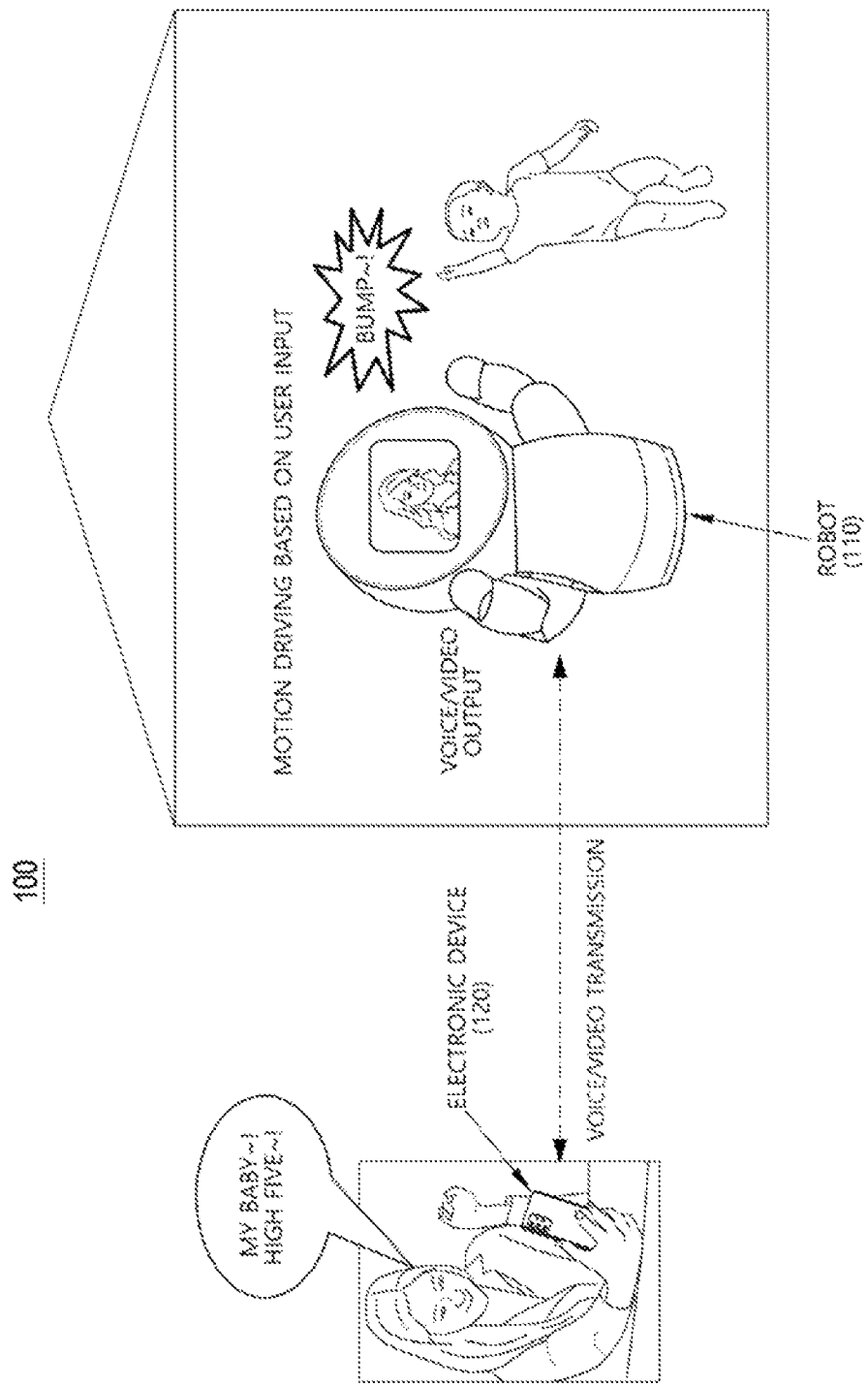
FIG. 1 shows a robot driving environment including a robot, an electronic device, and a network connecting the robot and the electronic device to each other according to various embodiments.

Terms used in various embodiments of the disclosure have been selected as general terms currently in wide use, while considering the functions of the disclosure, but they may vary depending on the intentions of those skilled in the art, any relevant precedents, the emergence of new technologies, and so on. Further, in a certain instance, a term arbitrarily selected by the Applicant may be used, in which case its meaning will be described in more detail in the description of the corresponding embodiment. Therefore, the terms used in the disclosure should be defined based on the substantive meaning of the term and the entire contents of the disclosure, rather than a simple name of the term.

Throughout the specification, when it is described that an element "include(s)" a certain component, it will mean that it may further include any other component(s), rather than excluding other components, unless otherwise clearly stated. Further, terms such as e.g., " . . . unit", " . . . module" or the like described throughout the specification will mean a unit to process at least one function or operation, which may be implemented as either hardware or software, or a combination of hardware and software.

Hereinafter, with reference to the accompanying drawings, various example embodiments will be described in detail so that those having ordinary knowledge in the art to which the disclosure pertains can easily implement the same. However, the disclosure may be implemented in several different forms and is not limited to the example embodiments described herein. In the drawings, like reference numerals refer to like elements or components, and the dimension of each component in the drawings may be partially exaggerated or scaled-down/up for better clarity of description.

FIG. 1 shows a robot driving environment including a robot, an electronic device, and a network connecting the robot and the electronic device to each other according to various embodiments.

According to various embodiments, the robot driving environment may include a networked robot 110 and an electronic device 120.

The electronic device 120 or the robot 110 may obtain a user input. The user input may include, for example, voice, text, image, emoticon, and gesture. The electronic device 120 or the robot 110 may obtain a text based on the user input and perform a natural language process for the obtained text to obtain a motion identifier for performing a motion.

According to an embodiment, the robot 110 and the electronic device 120 may perform voice and/or video communications with each other through their applications, respectively. The robot 110 may output a voice and/or a video provided from the electronic device 120. Further, the electronic device 120 may obtain the motion identifier based on the voice and/or the video. When the electronic device 120 obtains the motion identifier based on the user input, the robot 110 may receive the motion identifier from the electronic device 120. The robot 110 may drive a motion corresponding to the motion identifier.

According to various embodiments, the robot 110 or the electronic device 120 may adjust motion input processing based on the user input in consideration of a motion state of the robot.

Hereinafter, description is made to a method for driving the robot 110 including the user input, the motion identifier determination, the motion matching and the robot operation, with reference to FIG. 3 according to various embodiments.

According to various embodiments, the electronic device 120 may include a terminal capable of performing the computing and communication functions, and the like. The electronic device 120 may be a desktop computer, a smartphone, a notebook computer, a tablet PC, a smart TV, a mobile phone, a personal digital assistant (PDA), a laptop, a media player, a micro server, a global positioning system (GPS) device, an e-book terminal, a digital broadcasting terminal, a navigation system, a kiosk, an MP3 player, a digital camera, a home appliance, or other mobile or non-mobile computing devices, but is not limited thereto. Further, the electronic device 120 may be a wearable terminal of e.g., a watch, glasses, a hair band, a ring and so on, capable of performing the computing and communication functions. The electronic device 120 may be one of various types of terminals without limiting to the above description.

According to various embodiments, the network connecting the robot 110 and the electronic device 120 may be a short-range communication network such as e.g., Bluetooth, Wireless Fidelity (Wi-Fi), Zigbee, or Infrared Data Association (IrDA), and a remote area communication network such as e.g., a cellular network, a next-generation communication network, Internet, or a computer network (e.g., LAN or WAN). The cellular network may include, for example, Global System for Mobile Communications (GSM), Enhanced Data GSM Environment (EDGE), Code Division Multiple Access (CDMA), Time Division Multiplexing Access (TDMA), 5G, Long Term Evolution (LTE), and LTE Advanced (LTE-A). The network may include a connection of network elements such as e.g., hubs, bridges, routers, switches and gateways. The network may include one or more connected networks, for instance, a multiple network environment inclusive of a public network such as Internet and a private network such as a secured enterprise private network. Access to the network may be provided via one or more wired or wireless access networks. Furthermore, the network may support an Internet of Things (IoT) network for exchanging and processing information between distributed components of various things.

Figure 2:
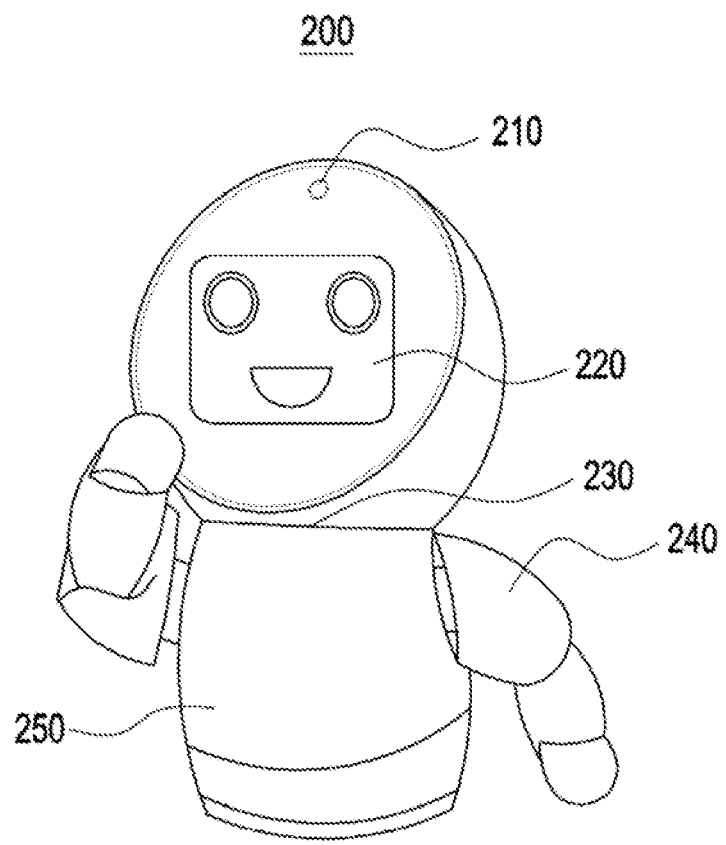
FIG. 2 is a diagram showing an appearance of a robot according to an embodiment.

FIG. 2 is a diagram showing an appearance of a robot (for example, the robot 110 of FIG. 1) according to an embodiment.

Referring to FIG. 2, the robot 200 may include a camera 210, a display 220, a neck 230, an arm 240, and a torso 250.

The camera 210 may capture an image around the robot 200. For example, the camera 210 may take a picture of a person (e.g., a child) around the robot 200. As such, the electronic device 120 may monitor people around the robot 200 through the robot 200. The camera 210 may include one or more cameras and may be located on the display 220, but the number and location of the cameras 210 is not limited thereto.

The display 220 may display a predetermined facial expression (such as e.g., a doll-like face), when the robot 200 does not communicate with other devices. When the robot 200 performs voice communication with the electronic device 120, the display 220 may output a predetermined screen. The predetermined screen may include a user video or a user image corresponding to the user of the electronic device 120, but is not limited thereto. When the robot 200 performs video communications with the electronic device 120, the display 220 may output an image received from the electronic device 120.

The robot 200 may include at least one connection part (i.e., a joint) in the neck 230, the arm 240, and the torso 250, and each connection part may have at least one degree of freedom (DOF). The degree of freedom may refer to the degree of freedom in kinematics or inverse kinematics. The degree of freedom may imply the minimum number of variables required to determine the position and posture of each joint. For example, each joint in a three-dimensional space consisting of x-axis, y-axis, and z-axis may have at least one degree of freedom of three degrees of freedom (position on each axis) to determine a spatial position and three degrees of freedom (angle of rotation about each axis) to determine a spatial posture. For example, when a joint is movable along each axis and is rotatable about each axis, it may be understood that the joint has six degrees of freedom. In order to implement the at least one degree of freedom in each connection part, each connection part may include at least one motor. For example, each degree of freedom may be implemented by each motor, or a certain number of degrees of freedom may be implemented by a single motor.

For example, when the connection part of the neck 230 in the robot 200 is rotatable about two axes (e.g., in a back-and-forth direction and a side-to-side direction), the connection part of the neck 230 may have two degrees of freedom. Further, there may be two arms 240, that is, a left arm and a right arm, and each arm 240 may include a shoulder connection part and an elbow connection part. When each of the shoulder connection part and the elbow connection part is rotatable about two axes, each of the shoulder connection part and the elbow connection part may have two degrees of freedom. Further, when the torso 250 connection part is rotatable about one axis, the torso 250 connection part may have one degree of freedom. However, the number and location of the connection parts and their respective degrees of freedom are not limited to the above examples.

Figure 3:
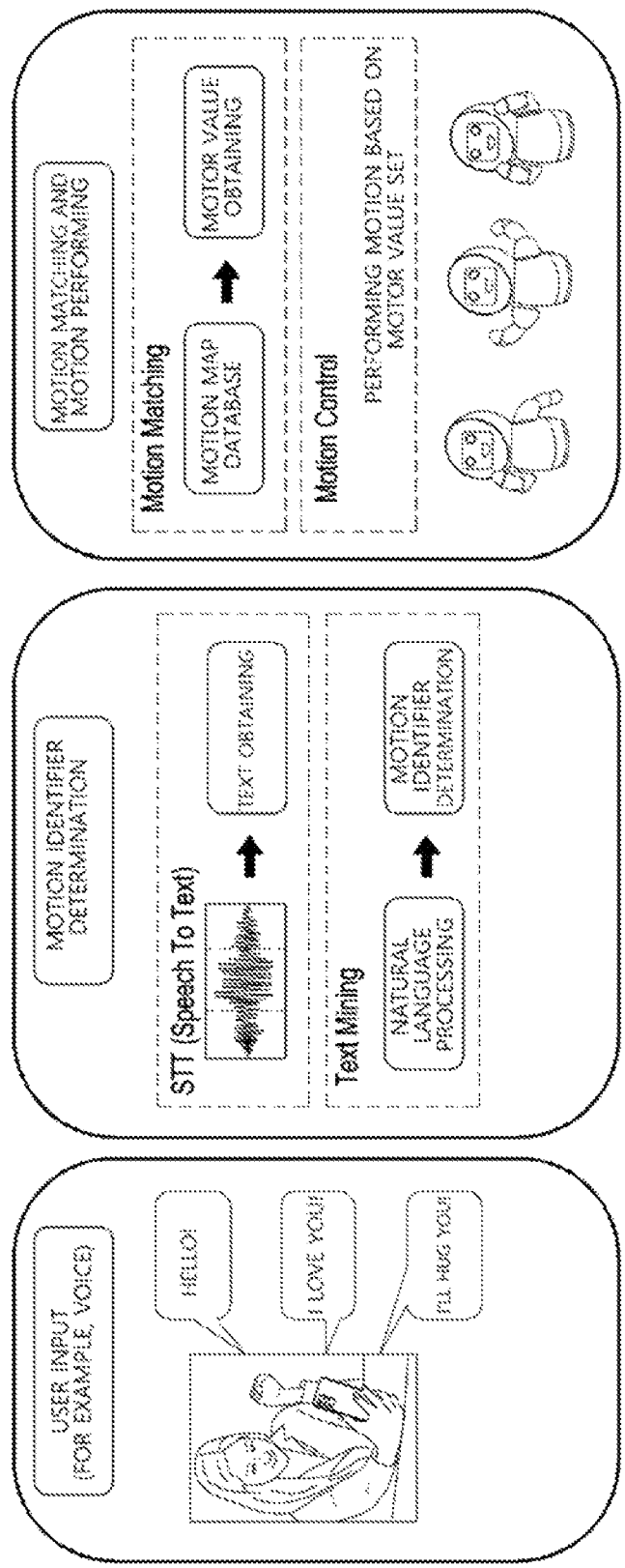
FIG. 3 is a diagram of a robot driving method including a user input, a motion identifier determination, a motion matching, and a robot operation according to an embodiment.

FIG. 3 conceptually illustrates a robot driving method including the user input, the motion identifier determination, the motion matching, and the robot operation according to an embodiment.

Referring to FIG. 3, the robot driving method may obtain a user input from the electronic device 120 or the robot 110 and determine a motion identifier based on the obtained user input.

The user input may include, for instance, voice, text, image, emoticon, gesture and the like. The electronic device 120 or the robot 110 may obtain at least one text through at least one of voice recognition, image recognition, emoticon recognition, and gesture recognition, based on the user input. For example, when the user input is of a voice, the electronic device 120 or the robot 110 may convert a signal, which is obtained from the outside by a user's utterance, into an electrical audio signal, and then obtain at least one text sequentially recognized from the converted audio signal. The electronic device 120 or the robot 110 may obtain at least one character string (or keyword) corresponding to each motion from the obtained at least one text through natural language processing. The natural language processing is a technology for allowing the electronic device 120 or robot 110, being a machine, to understand the human language, and may include splitting the natural language complying with grammar. The electronic device 120 or the robot 110 may determine each motion identifier based on the obtained respective character string. The motion identifier may identify each motion that the robot 110 can drive. The motion identifier may be the obtained character string or a numeric code corresponding to the obtained character string, but it is not limited thereto and may have various formats.

Based on the determined motion identifier in the robot 110, the robot driving method may obtain from a motion map database at least one set of motor values capable of driving a motion corresponding to the determined motion identifier, and drive the motion using the obtained at least one set of motor values.

Hereinafter, description is made of the operation of obtaining at least one set of motor values (or motion record) capable of driving a motion from the motion map database, based on the determined motion identifier, with reference to FIG. 4. Further, an operation of setting the motion map database will be described later with reference to FIG. 5.

Figure 4:
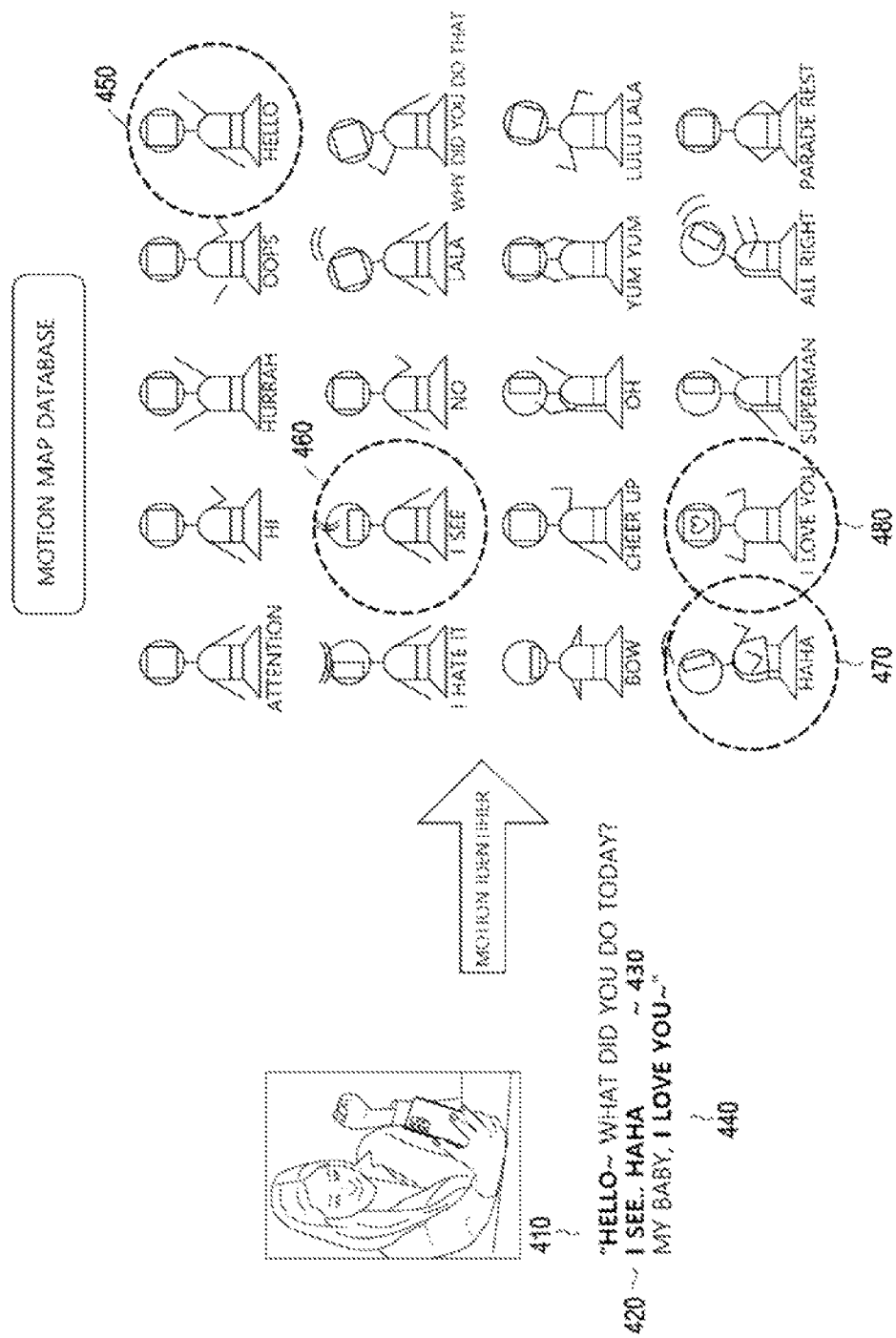
FIG. 4 is a diagram of obtaining a motion record corresponding to a motion identifier from a motion map database according to an embodiment.

FIG. 4 illustrates a conceptual diagram of obtaining a motion record corresponding to a motion identifier from a motion map database according to an embodiment.

Referring now to FIG. 4, the robot 110 may use the motion identifier to obtain a motion record from the motion map database, in order to drive the motion corresponding to the obtained motion identifier, based on a user input from the electronic device 120 or the robot 110.

In the illustrated example, the electronic device 120 or the robot 110 may obtain a voice input from a user, obtain at least one text based on the obtained voice input, and perform the natural language process onto the obtained at least one text, so as to obtain at least one character string (or keyword) corresponding to each motion. The electronic device 120 or the robot 110 may determine each motion identifier based on the obtained each character string. The motion identifier may identify each motion that the robot 110 can drive. The motion identifier may be the obtained character string or a numeric code corresponding to the obtained character string, but it is not limited thereto and may have various formats.

Table 1 below shows motion identifiers in the form of a character string or a numeric code corresponding to the character string in the example shown in FIG. 3.

TABLE 1

| Character String | Numeric Code |
|---|---|
| Hello (410) | 0 |
| I see (420) | 1 |
| Haha (430) | 2 |
| I love you (440) | 3 |

When the electronic device 120 obtains the motion identifier based on the user input, the robot 110 may receive the motion identifier from the electronic device 120. The robot 110 may store the motion map database, and the motion map database may be set by the robot 110 or an external device to be provided to the robot 110. The operation of setting the motion map database will be described later with reference to FIG. 5.

The robot 110 may obtain a motion record corresponding to the motion identifier from the motion map database by using the motion identifier. FIG. 4 shows the motion records 450 to 480 in the motion map database, corresponding to the motion identifiers 410 to 440 disclosed by way of examples in the above Table 1. Each motion record corresponding to each motion capable of driving by at least one motor may include a motion identifier and at least one set of motor values for each motion timeframe. Each motion record may further include information indicating a motion speed for each motion timeframe. For example, when a motion is driven at a motion speed corresponding to either one of acceleration, constant velocity, or deceleration in each of the motion timeframes, the motion record may further include information indicating the motion speed corresponding to one of acceleration, constant velocity, or deceleration for each of the motion timeframes.

Table 2 below exemplarily discloses a motion record corresponding to the motion identifier having the character string 'Hello' or the numeric code '0' in the examples of the Table 1. In the example of the Table 2, a connection part (joint) of each of a left arm, a right arm, a neck, and a torso may have one degree of freedom, and the one degree of freedom of each connection part exemplarily discloses the motion record corresponding to a scenario implemented by one motor. For example, for the motion corresponding to 'Hello', the motors each driving the left arm, the right arm, the neck and the torso may drive the left arm, the right arm, the neck and the torso by 0 degree, 0 degree, 0 degree and 0 degree, respectively, for a time period from 0 second to 1 second, with respect to one axis; drive the left arm, the right arm, the neck, and the torso by 0 degree, 60 degrees, 0 degree, and 0 degree, respectively, for a time period from 1 second to 2 seconds; and drive the left arm, the right arm, the neck, and the torso by 0 degree, 0 degree, 0 degree and 0 degree, respectively, for a time period from 2 seconds to 2.5 seconds.

TABLE 2

| Motion Identifier | At least one set of motor values for each motion timeframe {left arm, right arm, neck, and torso} |
|---|---|
| 0 (or 'Hello') | {1 sec., 0 deg., 0 deg., 0 deg., 0 deg.}, {2 sec, 0 deg., 60 deg., 0 deg., 0 deg.}, {2.5 sec., 0 deg., 0 deg., 0 deg., 0 deg.} |

Figure 5:
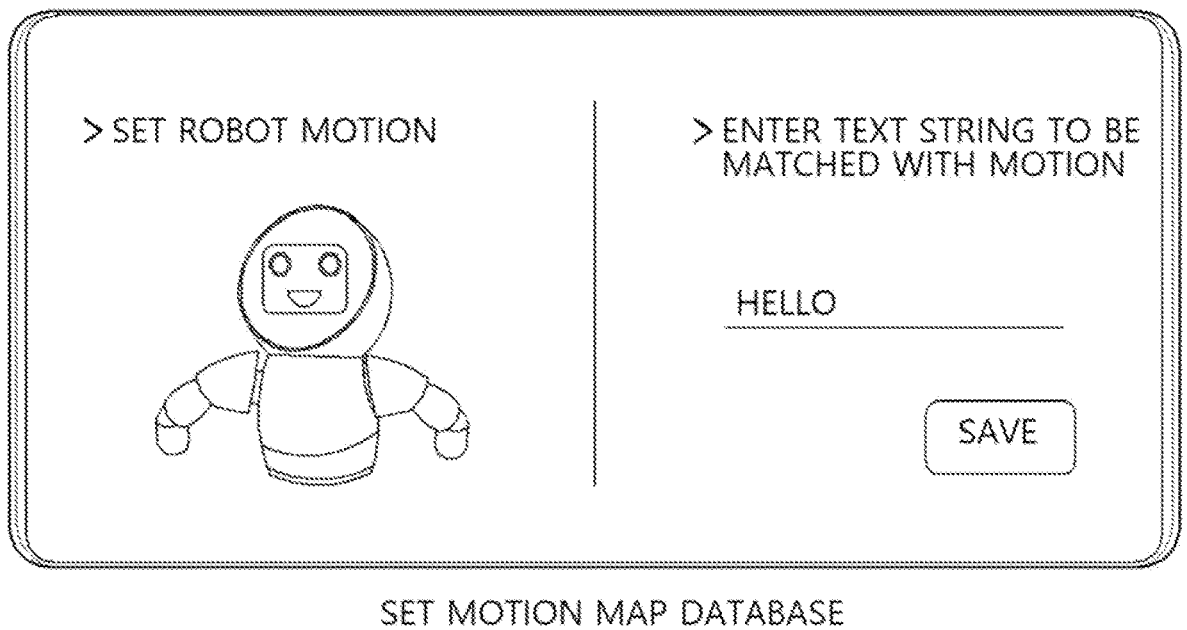
FIG. 5 is an exemplary diagram of setting a motion map database according to an embodiment.

FIG. 5 is diagram of setting a motion map database according to an embodiment.

Referring to FIG. 5, the electronic device 120 or the robot 110 may set a motion map database through an application. The electronic device 120 or the robot 110 may obtain a user input to set a motion of the robot and a character string corresponding to the set motion through the interface. In the example of FIG. 5, the electronic device 120 or the robot 110 may output a robot image, set a motion of the robot through conversion of the robot image and outputting of the converted image, based on a user input such as e.g., dragging or clicking the robot image, and receive a character string (e.g., 'Hello') corresponding to the set motion (e.g., 'Hello') of the robot from the user.

The electronic device 120 or the robot 110 may obtain a motion identifier based on the character string. The motion identifier may identify each motion that the robot 110 can drive. The motion identifier may be the obtained character string or a numeric code corresponding to the obtained character string, but it is not limited thereto and may have various formats.

The electronic device 120 or the robot 110 may obtain at least one set of motor values for each motion timeframe corresponding to the set motion. The electronic device 120 or the robot 110 may include an inverse kinematics module using Jacobian inverse matrix, and may map Cartesian Coordinate information corresponding to the set motion to Joint Coordinate information of the robot 110, using the inverse kinematics module. The electronic device 120 or the robot 110 may obtain at least one set of motor values for each motion timeframe corresponding to the set motion, from the Cartesian Coordinate information corresponding to the set motion.

The electronic device 120 or the robot 110 may store a record in the motion map database, wherein the record includes the motion identifier and at least one set of motor values for each motion timeframe. When a device other than the robot 110 (e.g., the electronic device 120) sets the motion map database, the robot 110 may receive the motion map database from the device.

Figure 6:
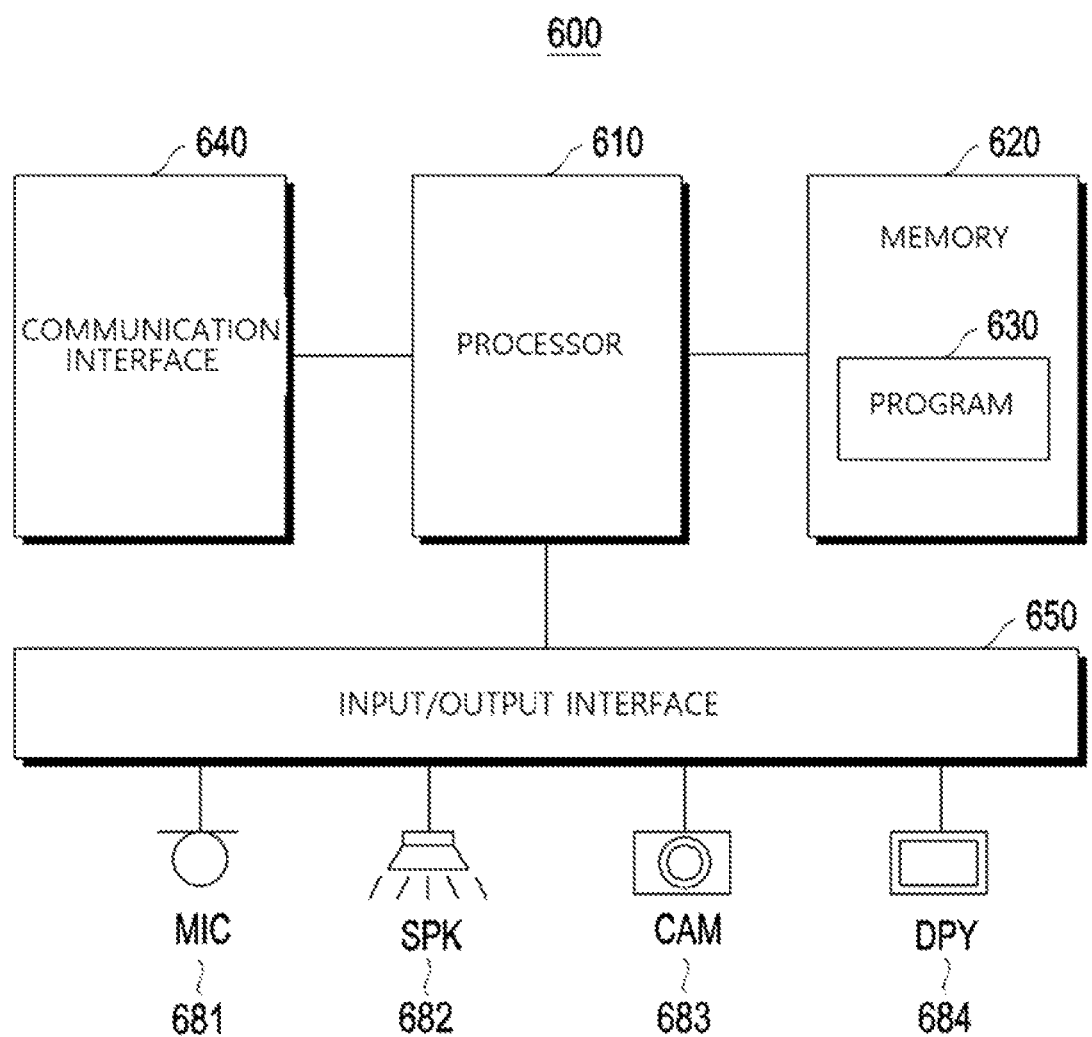
FIG. 6 is a schematic block diagram of an electronic device according to an embodiment.

FIG. 6 is a schematic block diagram of an electronic device according to an embodiment.

Referring now to FIG. 6, an electronic device 600 (e.g., the electronic device 120 of FIG. 1) may include a processor 610, a memory 620, a communication interface 640, and/or an input/output interface 650. At least one of a microphone (MIC) 681, a speaker (SPK) 682, a camera (CAM) 683, or a display (DPY) 684 may be connected to the input/output interface 650. The memory 620 may include a program 630 including one or more instructions. The program 630 may include an operating system (OS) program and an application program. The electronic device 600 may include any additional components in addition to the illustrated components, or omit at least one of the illustrated components, as circumstances demand.

According to an embodiment, the communication interface 640 may provide an interface for communication with other systems or devices. The communication interface 640 may include a network interface card or a wireless transmission/reception unit for enabling communications through an external network. The communication interface 640 may perform signal processing for accessing a wireless network. The wireless network may include, for example, at least one of a wireless LAN or a cellular network (e.g., LTE (Long Term Evolution) network).

According to an embodiment, the input/output interface 650 may detect an input from the outside (e.g., a user) and provide data corresponding to the detected input to the processor 610. The input/output interface 650 may include at least one hardware module to detect an input from the outside. The at least one hardware module may include, for example, at least one of a sensor, a keyboard, a key pad, a touch pad, or a touch panel. In a case where the input/output interface 650 is implemented as a touch panel, the input/output interface 650 may be coupled to the display 684 to provide a touch screen. In this instance, the input/output interface 650 may provide the processor 610 with data about a user's touch input such as e.g., tap, press, pinch, stretch, slide, swipe, rotate, or the like.

According to an embodiment, the display 684 may perform functions to output information in the form of numbers, characters, images, and/or graphics. The display 684 may include at least one hardware module for outputting. The at least one hardware module may include, for instance, at least one of a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED). The display 684 may display a screen corresponding to data received from the processor 610. The display 684 may be referred to as an 'output unit', a 'display unit', or other terms having technical meaning equivalent thereto.

According to an embodiment, the microphone 681, which may be electrically coupled to the processor 610 through the input/output interface 650, may convert an audible signal input from the outside due to a user's utterance into an electrical audio signal. The audio signal converted by the microphone 681 may be provided to the processor 610 through the input/output interface 650. A component that may be electrically coupled to the processor 610 through the input/output interface 650, in addition to the microphone 681, may be at least one of the speaker 682 or the camera 683. The speaker 682 may convert the electrical audio signal provided from the processor 610 through the input/output interface 650 into an audible signal that humans can hear, and then output the audible signal. The camera 683 may capture a subject in response to a control from the processor 610, and convert the captured image into an electrical signal to be provided to the processor 610 through the input/output interface 650.

According to an embodiment, the memory 620 may store data such as e.g., a program 630 including one or more instructions or setting information. The program 630 may include an operating system program corresponding to a basic program for the overall operation of the electronic device 600 and one or more application programs for supporting various functions. The memory 620 may be composed of a volatile memory, a non-volatile memory, or a combination of a volatile memory and a non-volatile memory. The memory 620 may provide the stored data according to a request of the processor 610.

According to an embodiment, the processor 610 may use the program 630 stored in the memory 620 to execute the operation or data processing required for the control and/or communication of at least one other components in the electronic device 600. The processor 610 may include, for example, at least one of a central processing unit (CPU), a graphics processing unit (GPU), a micro controller unit (MCU), a sensor hub, a supplementary processor, a communication processor, an application processor, an application specific integrated circuit (ASIC) or field programmable gate arrays (FPGA), and may have multiple cores.

According to an embodiment, the processor 610 may process data obtained through the input/output interface 650 or control operation states of various input and/or output means through the input/output interface 650. The various input and/or output means may be, for example, at least one of a microphone (MIC) 681, a speaker (SPK) 682, a camera (CAM) 683, or a display (DPY) 684. The processor 610 may transmit and/or receive signals through the communication interface 640.

According to an embodiment, the input/output interface 650 may obtain a user input. The user input may include, for example, voice, text, image, emoticon, and/or gesture.

According to an embodiment, the communication interface 640 may receive a motion state corresponding to one of an active state or an idle state from the robot 110. The motion state may be received from the robot 110 when the motion state is changed in the robot 110, received from the robot 110 in response to a motion identifier transmission, or received from the robot 110 as a response to a motion state request of the electronic device 600. Among the motion states, the active motion state may mean a state in which at least one motor of the robot 110 is being driven, and the idle motion state may mean a state in which none of the motors is being driven in the robot 110.

According to an embodiment, the processor 610 may obtain a motion identifier based on the user input. The processor 610 may obtain a text based on the user input and perform a natural language process for the obtained text to obtain at least one character string (or keyword) corresponding to each motion. The processor 610 may determine each motion identifier based on the obtained each character string. The motion identifier may identify each motion that the robot 110 can drive. The motion identifier may be either the obtained character string or a numeric code corresponding to the obtained character string, but it is not limited thereto and may have various formats.

The processor 610 may store the obtained motion identifier in the memory 620, when the motion state received from the robot 110 is the active state.

According to an embodiment, the processor 610 may not store the motion identifier in the memory 620, based on a preset storage option. The preset storage option may be set to a value indicating either 'Enable' or 'Disable'. When the preset storage option is of a value indicating 'Disable' and the motion state received from the robot 110 is the active state, the processor 610 may skip the obtained motion identifier without storing it in the memory 620, so as to adjust motion input processing in consideration of the motion state of the robot.

When the motion state is the idle state, the processor 610 may determine a motion identifier based on a predetermined criterion from the at least one stored motion identifier. The processor 610 may control to transmit the determined motion identifier to the robot, using the communication interface 640. The communication interface 640 may transmit the determined motion identifier to the robot.

The predetermined criterion may correspond to one of a motion identifier set based on an external input, a motion identifier obtained the most based on the user input, or a most recently stored motion identifier. For example, a predetermined motion identifier set based on the external input may be a motion identifier determined to be used the most frequently, based on various formats of external information. Further, the predetermined motion identifier set based on the external input may be of a null value. In this instance, when the motion state received from the robot 110 is the active state, the obtained motion identifier may be skipped in the electronic device 600, so that the electronic device 600 can adjust the motion input processing in consideration of the motion state of the robot.

Accordingly, for the motion identifier obtained based on the user input, the processor 610 may store the obtained motion identifier in the memory 620 when the robot is in an active motion state, and when the robot is in an idle motion state, determine a motion identifier from the stored at least one motion identifier based on a predetermined criterion, and control the communication interface 640 to transmit the determined motion identifier to the robot 120, thereby adjusting the motion input processing in consideration of the motion state of the robot.

Figure 7:
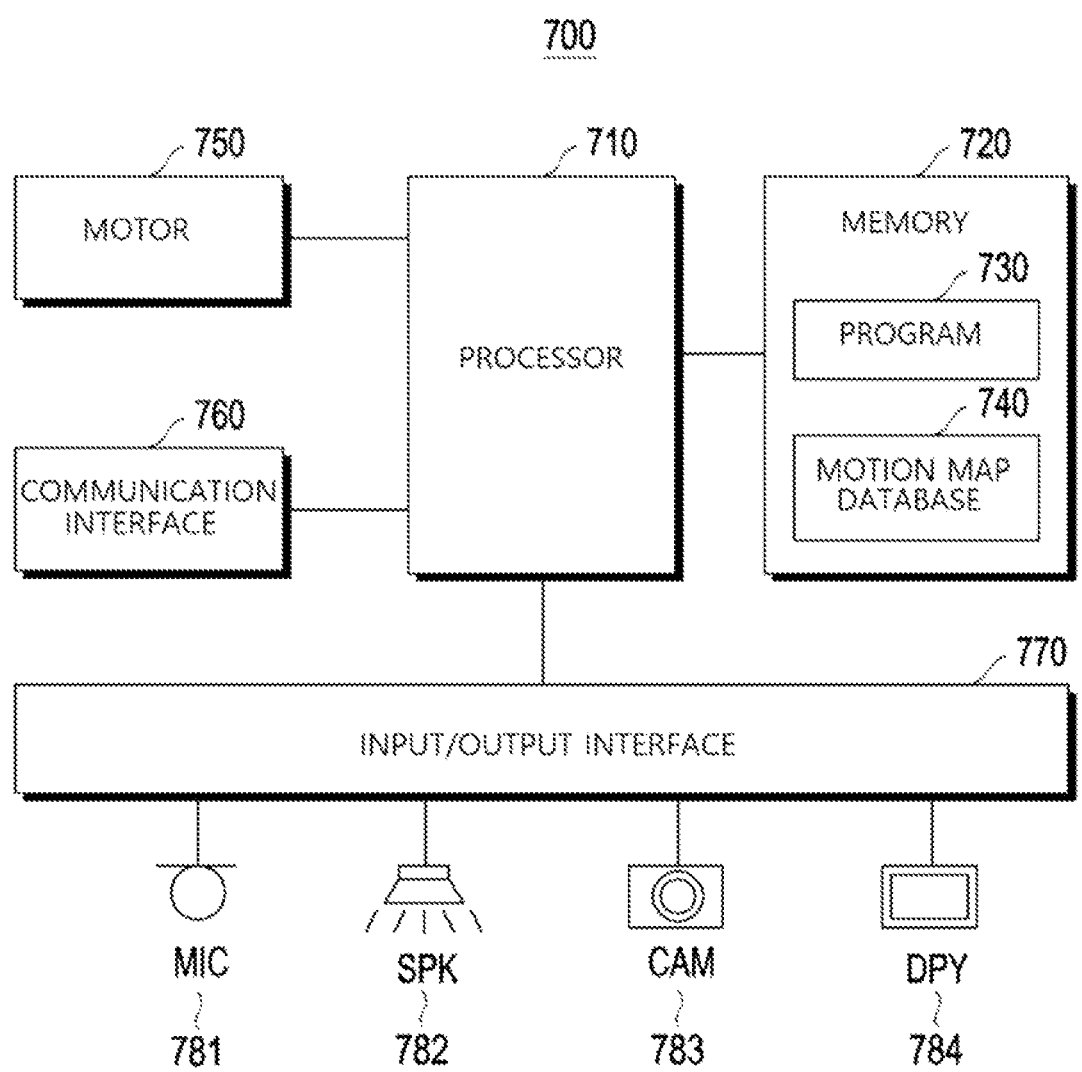
FIG. 7 is a schematic block diagram of a robot according to an embodiment.

FIG. 7 is a schematic block diagram of a robot according to an embodiment.

Referring to FIG. 7, the robot 700 (for example, the robot 110 of FIG. 1) may include a processor 710, a memory 720, a motor 750, a communication interface 760, and/or an input/output interface 770. At least one of a microphone (MIC) 781, a speaker (SPK) 782, a camera (CAM) 783, and a display (DPY) 784 may be connected to the input/output interface 770. The memory 720 may store a program 730 including one or more instructions and a motion map database 740. The program 730 may include an operating system (OS) program and at least one application program. The robot 700 may include additional components in addition to the illustrated components, or may omit at least one of the illustrated components as required.

According to an embodiment, the communication interface 760 may provide an interface for communication with other systems or devices. The communication interface 760 may include a network interface card or a wireless transmission/reception unit enabling communication through an external network. The communication interface 760 may perform signal processing for accessing a wireless network. The wireless network may include, for example, at least one of a wireless LAN or a cellular network (e.g., Long Term Evolution (LTE)).

According to an embodiment, the input/output interface 770 may detect an input from the outside (e.g., a user) and provide data corresponding to the detected input to the processor 710. The input/output interface 770 may include at least one hardware module for detecting an input from the outside. The at least one hardware module may include, for example, at least one of a sensor, a keyboard, a key pad, a touch pad, or a touch panel. When the input/output interface 770 is implemented as a touch panel, the input/output interface 770 may be coupled to the display 784 to provide a touch screen. In this context, the input/output interface 770 may provide the processor 710 with data about a user's touch input such as, for example, tap, press, pinch, stretch, slide, swipe, rotate or the like.

According to an embodiment, the display 784 may perform functions to output information in the form of numbers, characters, images, and/or graphics. The display 784 may include at least one hardware module for outputting. The at least one hardware module may include, for example, at least one of a Liquid Crystal Display (LCD), a Light Emitting Diode (LED), a Light Emitting Polymer Display (LPD), an Organic Light Emitting Diode (OLED), and an Active Matrix Organic Light Emitting Diode (AMOLED), or a Flexible LED (FLED). The display 784 may display a screen corresponding to data received from the processor 710. The display 784 may be referred to as an 'output unit', a 'display unit', or other terms having technical meaning equivalent thereto.

According to an embodiment, the microphone 781 that may be electrically coupled to the processor 710 through the input/output interface 770 may convert an audible signal input from the outside due to a user's utterance into an electrical audio signal. The audio signal converted by the microphone 781 may be provided to the processor 710 through the input/output interface 770. Any other component that may be electrically coupled to the processor 710 through the input/output interface 770, in addition to the microphone 781, may be at least one of a speaker 782 or a camera 783. The speaker 782 may convert the electrical audio signal provided from the processor 710 through the input/output interface 770 into an audible signal that a person can hear and then output the audible signal. The camera 783 may capture a subject in response to a control from the processor 710, convert the captured image into an electrical signal, and provide the captured image to the processor 710 through the input/output interface 770.

According to an embodiment, the memory 720 may store a program 730 including one or more instructions and a motion map database 740. The memory 720 may further store data such as, for example, the setting information. The program 730 may include an operating system program corresponding to a basic program for the operation of the robot 700 and at least one application program supporting various functions. The memory 720 may include a volatile memory, a non-volatile memory, or a combination of a volatile memory and a non-volatile memory. The memory 720 may provide the stored data according to a request of the processor 710.

According to one embodiment, the processor 710 may use the program 730 stored in the memory 720 to execute operations or data processing relating to the control and/or communication of at least one other component in the robot 700. The processor 710 may include, for instance, at least one of a central processing unit (CPU), a graphics processing unit (GPU), a micro-controller unit (MCU), a sensor hub, a supplementary processor, a communication processor, an application processor, an application specific integrated circuit (ASIC), or field programmable gate arrays (FPGA), and may have a plurality of cores.

According to an embodiment, the processor 710 may process data obtained through the input/output interface 770 or control the operating states of various input and/or output means through the input/output interface 770. The various input and/or output means may be, for example, at least one of a microphone (MIC) 781, a speaker (SPK) 782, a camera (CAM) 783 or a display (DPY) 784. The processor 710 may transmit and/or receive a signal through the communication interface 760.

According to an embodiment, the motor 750 may include at least one motor that drives the robot to perform a predetermined motion. The motor 750 may be electrically connected to the processor 710 and may be controlled by the processor 710 to drive the motion of the robot. In order to implement at least one degree of freedom in each connection part (a joint) of the robot, the robot 700 may include at least one motor corresponding to each connection part. For example, each degree of freedom of the connection part may be implemented by each motor, or a predetermined number of degrees of freedom thereof may be implemented by one motor.

According to an embodiment, the processor 710 may obtain a motion identifier based on a user input. The processor 710 may obtain the motion identifier determined based on the user input through the input/output interface 770, or the communication interface 760 may receive from the electronic device 120 the motion identifier determined based on the user input in the electronic device 120 so that the processor 710 can obtain the received motion identifier from the communication interface 760. The user input may include, for instance, voice, text, image, emoticon, and gesture.

The processor 710 may identify a motion state indicating whether the robot 700 is performing a motion. When the motion state is the active state, the processor 710 may store the obtained motion identifier in the memory 720.

According to an embodiment, the processor 710 may not store the motion identifier in the memory 720, based on a preset storage option. The preset storage option may be set to a value indicating either 'Enable' or 'Disable'. When the preset storage option is a value indicating 'Disable' and the motion state is in the active state, the processor 710 may skip the obtained motion identifier without storing it in the memory 720, thereby adjusting the motion input processing in consideration of the motion state of the robot.

When the motion state is IDLE, the processor 710 may control to determine a motion identifier from the at least one stored motion identifier, based on a predetermined criterion, and cause the motor 750 to drive the motion corresponding to the determined motion identifier, based on the motion map database 740. The active motion state of the motion states may mean a state in which at least one motor of the robot 700 is being driven, and the idle motion state may mean a state in which none of the motors is being driven in the robot 700.

The motion map database may include, for each motion drivable by the at least one motor, a motion identifier and at least one set of motor values for each motion timeframe.

The predetermined criterion may correspond to one of a motion identifier set based on an external input, a motion identifier most obtained based on the user input, or a most recently stored motion identifier. For example, the predetermined motion identifier set based on the external input may be a motion identifier determined to be used the most frequently based on various formats of external information. Further, the predetermined motion identifier set based on the external input may be of a null value. In this instance, when the robot 700 is in the active motion state, the obtained motion identifier may be skipped without being driven for a motion, thereby adjusting the motion input processing in consideration of the motion state of the robot.

According to an embodiment, the motor 750 may drive the motion at a motion speed corresponding to one of acceleration, constant velocity, or deceleration in each motion timeframe, based on at least one set of motor values for each motion timeframe, being obtained using the motion identifier from the motion map database 740. For example, the motor 750 may sequentially drive the motion at a motion speed of acceleration, constant velocity, or deceleration, thereby naturally driving the motion and therefore, enhancing the user experience. When the motor 750 is being driven at a predetermined motion speed, the processor 710 may store the obtained motion identifier in the memory 720. For example, the processor 710 may store the obtained motion identifier in the memory 720, when the motion is being driven at a motion speed corresponding to one of constant velocity or deceleration. As another example, when the motion is being driven at a motion speed corresponding to deceleration, the processor 710 may store the obtained motion identifier in the memory 720. Through the above examples, the processor 710 may skip the obtained motion identifier without storing it in the memory 720 when the motion is being driven in an initial operation section (e.g., acceleration period) of the entire operation period of the motion (i.e., a plurality of timeframes), thereby adjusting the motion input processing.

According to an embodiment, the robot 700 may generate a motion map database 740. In this instance, the input/output interface 770 may obtain a user input to set a motion of the robot, and a character string corresponding to the set motion. The processor 710 may obtain a motion identifier based on the character string. The processor 710 may obtain at least one set of motor values for each motion timeframe, corresponding to the set motion. The processor 710 may store a record in the motion map database 740, wherein the record includes the motion identifier and at least one set of motor values for each of the motion timeframes.

Figure 8:
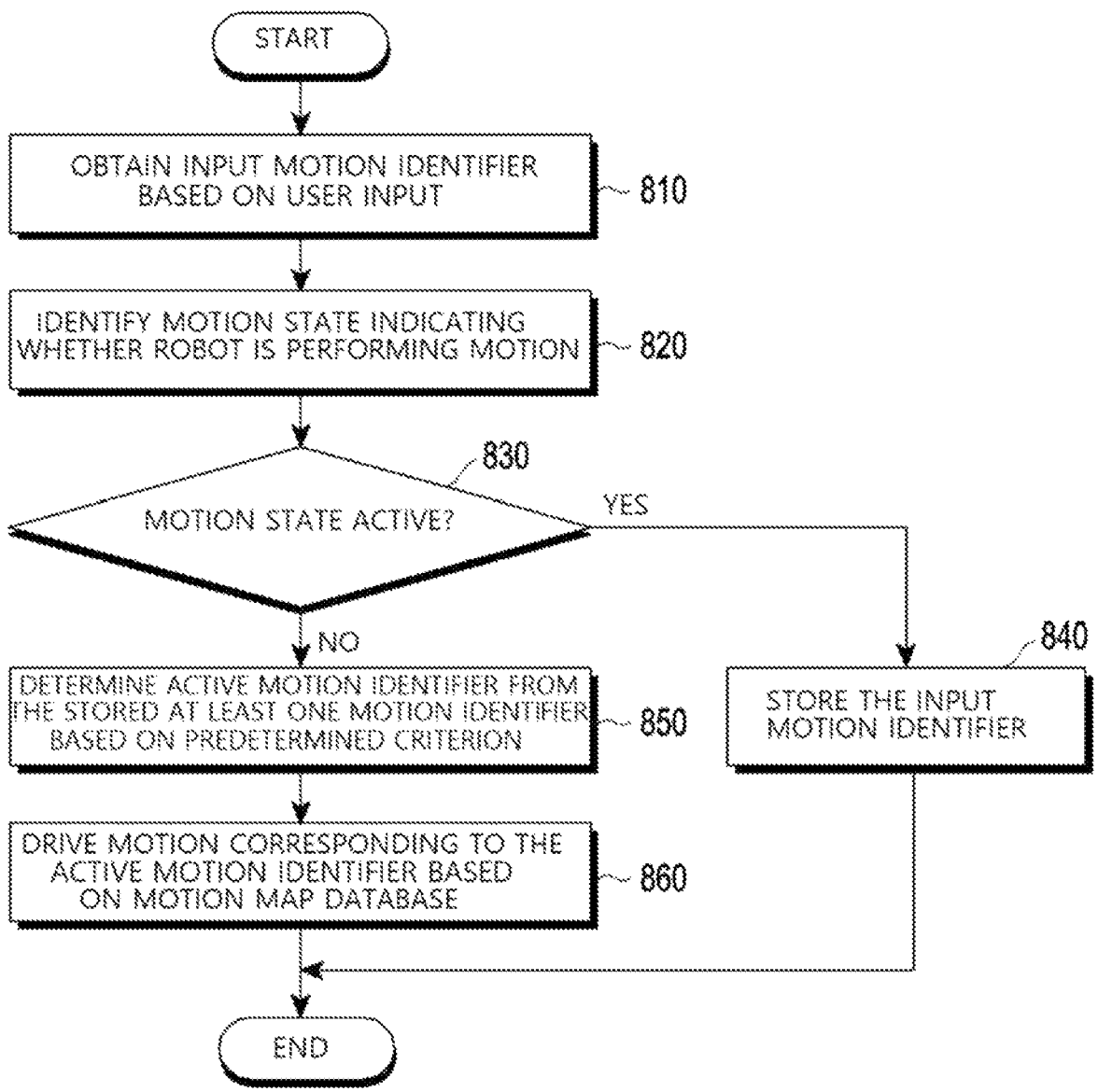
FIG. 8 is a flowchart of a driving method of a robot according to an embodiment.

FIG. 8 shows a schematic flowchart of a driving method in a robot according to an embodiment.

Referring now to FIG. 8, in operation 810 according to an embodiment, the robot 110 may obtain an input motion identifier based on a user input. The robot 110 may receive the motion identifier corresponding to the user input from the electronic device 120 to obtain the input motion identifier. Alternatively, the robot 110 may obtain the user input using the interface and determine the input motion identifier based on the obtained user input. The user input may include, for example, voice, text, image, emoticon, and gesture.

In operation 820 according to an embodiment, the robot 110 may identify a motion state indicating whether the robot 110 is performing a motion.

In operation 830 according to an embodiment, the robot 110 may determine whether the motion state is the active state. If the motion state is the active state, an operation 840 may be performed, and if the motion state is not the active state (i.e., idle state), an operation 850 may be performed.

In the operation 840 according to an embodiment, the robot 110 may store the input motion identifier.

In the operation 850 according to an embodiment, the robot 110 may determine an active motion identifier from at least one stored motion identifier, based on a predetermined criterion. The predetermined criterion may correspond to one of a motion identifier set based on an external input, a motion identifier most obtained based on a user input, or a most recently stored motion identifier.

In operation 860 according to an embodiment, the robot 110 may drive the motion corresponding to the active motion identifier, based on the motion map database. The motion map database may include at least one record corresponding to each motion, wherein the at least one record includes the motion identifier and at least one set of motor values for each motion timeframe.

According to one embodiment, the robot 110 may drive the motion at a motion speed corresponding to one of acceleration, constant velocity, or deceleration in each of the motion timeframes, based on at least one set of motor values for each motion timeframe. In this instance, the operation of storing the input motion identifier (operation 840) may be an operation of storing the input motion identifier, when the motion is being driven at a predetermined motion speed. For example, when the robot 110 is driving the motion at a motion speed corresponding to one of constant velocity or deceleration, the input motion identifier may be stored. As another example, when the robot 110 is driving the motion at a motion speed corresponding to deceleration, the input motion identifier may be stored. Through the above examples, the robot 110 may skip the input motion identifier without storing it into the memory, when the motion is being driven in the initial motion section (e.g., acceleration period) of the entire operation period of the motion, thereby adjusting the motion input processing.

According to an embodiment, the robot 110 may set the motion map database. In this case, the robot 110 may set a motion of the robot, obtain a character string corresponding to the set motion, and obtain a motion identifier based on the character string. The robot 110 may obtain at least one set of motor values for each motion timeframe, corresponding to the set motion. The robot 110 may store a record in the motion map database, wherein the record includes the motion identifier and at least one set of motor values for each of the motion timeframes.

Figure 9:
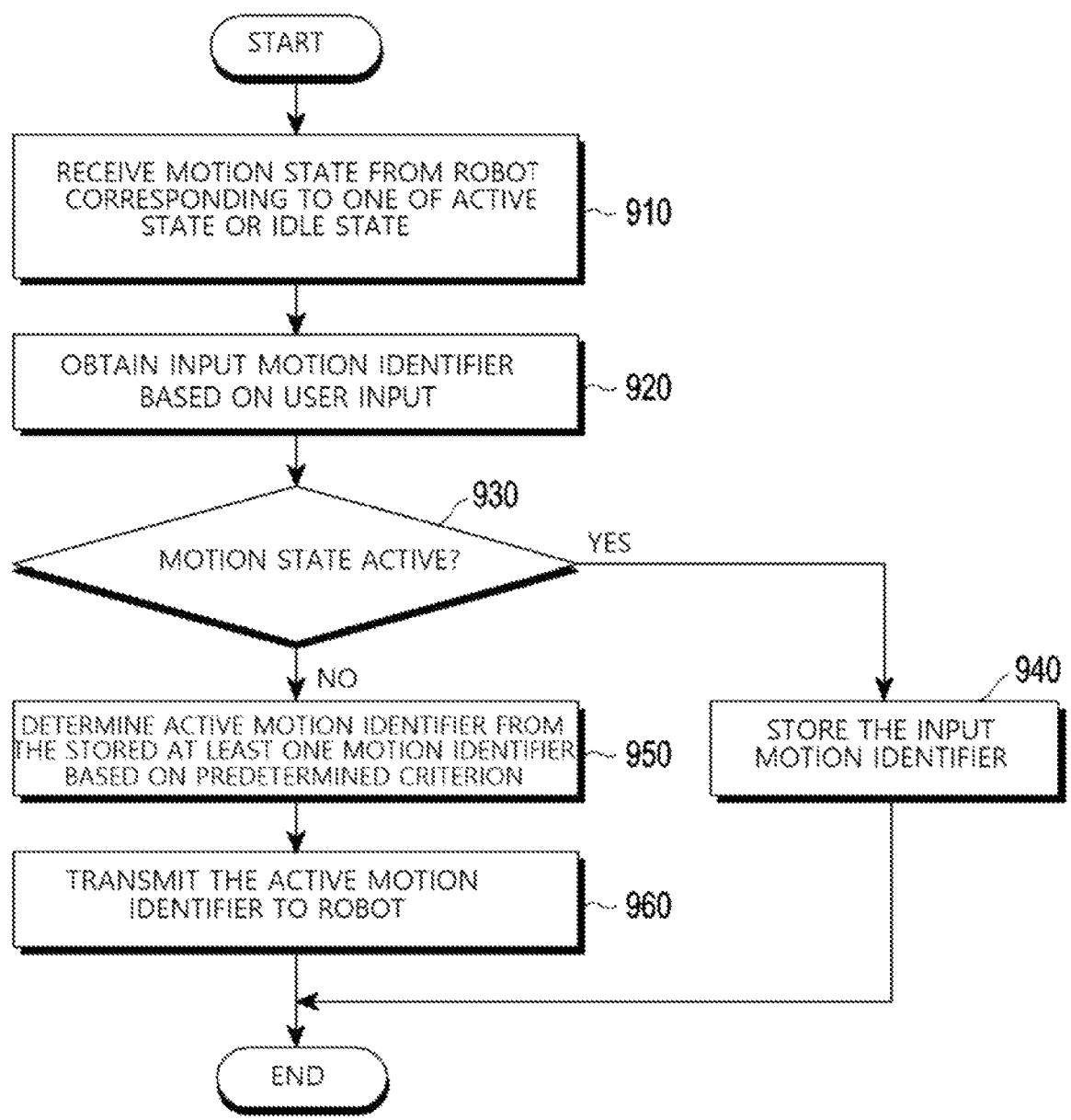
FIG. 9 is a flowchart of an operating method of an electronic device according to an embodiment.

FIG. 9 shows a schematic flowchart of a method of operating an electronic device according to an embodiment.

Referring now to FIG. 9, in operation 910 according to an embodiment, the electronic device 120 may receive a motion state corresponding to one of an active state or an idle state from the robot 110. The operation 910 may be performed before or after the operation 920.

In operation 920 according to an embodiment, the electronic device 120 may obtain an input motion identifier based on a user input.

In operation 930 according to an embodiment, the electronic device 120 may determine whether the motion state is the active state. If the motion state is the active state, an operation 940 may be performed, and if the motion state is not active state (i.e., idle state), an operation 950 may be performed.

In operation 940 according to an embodiment, the electronic device 120 may store the input motion identifier.

In operation 950 according to an embodiment, the electronic device 120 may determine a motion identifier from at least one stored motion identifier, based on a predetermined criterion. The predetermined criterion may correspond to one of a motion identifier set based on an external input, a most extracted motion identifier, or a most recently stored motion identifier.

In operation 960 according to an embodiment, the electronic device 120 may transmit the determined motion identifier to the robot 110.

The electronic device 600, the robot 700, the electronic device 600, and the program executed by the robot 700, as described throughout the disclosure, may be implemented with hardware components, or software components, and/or a combination of hardware components and software components. The program may be executed by any system capable of executing computer readable instructions.

The software may include computer programs, codes, instructions, or a combination of one or more of these, and may configure a processing unit to operate as desired or command the processing unit either independently or collectively. The software may be implemented as a computer program including instructions stored in a computer-readable storage medium. The computer-readable recording medium may include, for example, a magnetic storage medium (e.g., floppy disk, hard disk, etc.), a solid-state storage medium (e.g., read-only memory (ROM), random-access memory (RAM), etc.), an optical-readable storage medium (e.g., CD-ROM, Digital Versatile Disc (DVD), etc.) or the like. The computer-readable recording medium may be distributed over network-connected computer systems, so that the computer-readable codes can be stored and executed in a distributed manner. The medium may be readable by a computer, stored in a memory, and executed on a processor.

The computer-readable storage medium may be provided in the form of a non-transitory storage medium. Here, the term "non-transitory" may merely imply that the storage medium does not include a signal and is tangible, and it does not distinguish that data is semi-permanently or temporarily stored in the storage medium.

Further, the program according to embodiments may be contained in a computer program product. The computer program products may be traded between sellers and buyers as commodities. The computer program product may include a software program and a computer-readable storage medium in which the software program is stored. For example, the computer program product may include a product (e.g., a downloadable application) in the form of a software program distributed electronically via a manufacturer of such a device or an electronic market (e.g., Google™ Play Store, App Store). For the electronic distribution, at least a portion of the software program may be stored in a storage medium or may be temporarily generated.

In this context, the storage medium may be a server of the manufacturer, a server of the electronic market, or a storage medium of a relay server temporarily storing a software program.

In a system composed of a server and a device, the computer program product may include a storage medium of the server or a storage medium of the device. Alternatively, in case where there is a third device (e.g., a smartphone) that is communicatively connected to the server or the device, the computer program product may include a storage medium of the third device. Alternatively, the computer program product may include the software program itself transmitted from the server to the device or the third device or transmitted from the third device to the device. In this instance, one of the server, the device and the third device may execute the computer program product to perform the methods according to the embodiments. Further, two or more of the server, the device, and the third device may execute the computer program product to implement the methods according to the disclosed embodiments in a distributed manner. For example, the server may execute the computer program product stored in the server to control a device communicatively connected with the server to perform the methods according to the embodiments. As another example, the third device may execute the computer program product to control the device communicatively connected with the third device to perform the methods according to the embodiments. When the third device executes the computer program product, the third device may download the computer program product from the server and execute the downloaded computer program product. Alternatively, the third device may execute the computer program product provided in a pre-loaded state to perform the methods according to the embodiments.

As described above, although various embodiments have been described with particular reference to the disclosed embodiments and the accompanying drawings, it should be noted that various modifications and changes would be possible from the above description by those skilled in the art. For example, the techniques described heretofore may be performed in a different order than the described methods, and/or the components such as the computer systems or modules described above may be either coupled or combined in a different form than the described method, or may be substituted by other components or equivalents thereof, achieving the appropriate and equivalent results.

The invention claimed is:

1. A robot comprising:
at least one motor driving the robot to perform a predetermined motion;
a memory storing a motion map database and a program comprising one or more instructions; and
at least one processor electrically connected to the at least one motor and the memory, the at least one processor being configured to execute the one or more instructions of the program stored in the memory to:
obtain an input motion identifier based on a user input,
identify a motion state indicating whether the robot is performing a motion,
based on the motion state being in an active state, store the input motion identifier in the memory, and
based on the motion state being in an idle state:
determine an active motion identifier from at least one motion identifier stored in the memory based on a predetermined criterion; and control the at least one motor to drive the robot to perform a motion corresponding to the active motion identifier based on the motion map database.

2. The robot according to claim 1, wherein the predetermined criterion corresponds to one of a motion identifier set based on an external input, a most obtained motion identifier, or a most recently stored motion identifier.

3. The robot according to claim 1, further comprising one or more of:
a communication interface configured to receive the input motion identifier from an electronic device; or
an input/output interface configured to obtain the user input,
wherein the user input comprises voice, text, image, emoticon and gesture.

4. The robot according to claim 1, wherein the motion map database comprises at least one record corresponding to each motion drivable by the at least one motor, and
wherein the at least one record comprises at least one motion identifier and at least one set of motor values for each motion timeframe of each of the at least one motion identifier.

5. The robot according to claim 1, wherein:
the at least one motor is configured to drive the robot to perform the motion at a motion speed corresponding to one of acceleration, constant velocity, or deceleration in each motion timeframe, based on at least one set of motor values for each motion timeframe that are obtained using the active motion identifier from the motion map database; and
the at least one processor is configured to store the input motion identifier in the memory, based on the at least one motor being driven at a predetermined motion speed.

6. The robot according to claim 1, further comprising:
an input/output interface configured to obtain a user input for setting a motion of the robot and a character string corresponding to the set motion,
wherein the at least one processor is further configured to execute the one or more instructions of the program stored in the memory to:
obtain a candidate motion identifier based on the character string,
obtain at least one set of motor values for each motion timeframe, corresponding to the set motion, and
store a record in the motion map database, wherein the record comprises the candidate motion identifier and the at least one set of motor values for each motion timeframe.

7. An electronic device comprising:
an input/output interface configured to obtain a user input;
a communication interface configured to receive a motion state corresponding to either one of an active state or an idle state from a robot;
a memory storing a program comprising one or more instructions; and
at least one processor electrically connected to the input/output interface, the communication interface, and the memory, the at least one processor being configured to execute the one or more instructions of the program stored in the memory to:
obtain an input motion identifier based on the user input,
based on the motion state being in the active state, store the input motion identifier in the memory; and
based on the motion state being in the idle state:
determine an active motion identifier from at least one motion identifier stored in the memory based on a predetermined criterion; and
transmit the active motion identifier to the robot using the communication interface.

8. The electronic device according to claim 7, wherein the predetermined criterion corresponds to one of a motion identifier set based on an external input, a most obtained motion identifier, or a most recently stored motion identifier.

9. A method of driving a robot comprising:
obtaining an input motion identifier based on a user input;
identifying a motion state indicating whether the robot is in an active state or an idle state;
based on the motion state being in the active state, storing the input motion identifier; and
based on the motion state being in the idle state:
determining an active motion identifier from at least one stored motion identifier based on a predetermined criterion; and
driving a motion corresponding to the active motion identifier based on a motion map database.

10. The method according to claim 9, wherein the predetermined criterion corresponds to one of a motion identifier set based on an external input, a most obtained motion identifier, or a most recently stored motion identifier.

11. The method according to claim 9, wherein:
the obtaining the input motion identifier based on the user input comprises one of: receiving the determined motion identifier based on the user input from an electronic device or obtaining the user input using an input/output interface; and
the user input comprises voice, text, image, emoticon and gesture.

12. The method according to claim 9, wherein the motion map database comprises at least one record corresponding to each motion drivable by the at least one motor, wherein the at least one record comprises at least one motion identifier and at least one set of motor values for each motion timeframe of each of the at least one motion identifier.

13. The method according to claim 9, wherein:
the driving the motion corresponding to the active motion identifier is an operation to drive the motion at a motion speed corresponding to one of acceleration, constant velocity, or deceleration in each of motion timeframes, based on at least one set of motor values for each of motion timeframes of the motion; and
the storing the input motion identifier is an operation to store the input motion identifier, based on the motion being driven at a predetermined motion speed.

14. The method according to claim 9, further comprising:
obtaining a user input for setting a motion of the robot;
obtaining a character string corresponding to the set motion;
obtaining a candidate motion identifier based on the character string;
obtaining at least one set of motor values for each motion timeframe corresponding to the set motion; and
storing a record in the motion map database, wherein the record comprises the candidate motion identifier and the at least one set of motor values for each motion timeframe.

15. A method of operating an electronic device, comprising:
receiving from a robot a motion state indicating one of an active state or an idle state;
obtaining an input motion identifier based on a user input;

based on the motion state being in the active state, storing the input motion identifier; and based on the motion state being in the idle state:
  determining an active motion identifier from at least one stored motion identifier based on a predetermined criterion; and
  transmitting the active motion identifier to the robot.

16. The method according to claim 15, wherein the predetermined criterion corresponds to one of a motion identifier set based on an external input, a most obtained motion identifier, or a most recently stored motion identifier.

17. A robot comprising:
  at least one motor driving the robot to perform one or more a motions;
  a memory storing a program comprising one or more instructions;
  an input/output interface configured to output text and voice; and
  at least one processor electrically connected to the at least one motor and the memory, the at least one processor being configured to execute the one or more instructions of the program stored in the memory to:
    obtain a user input from a user, the user input comprising one or more of text and voice;
    obtain a plurality of motion identifiers based on the one or more of the text or voice;
    obtain a plurality of motions corresponding to the plurality of motion identifiers;
    control the input/output interface to output the one or more of the text and voice; and
    control the at least one motor to drive the robot to perform one or more of the plurality of motions as text or voice of a corresponding motion is output by the input/output interface.

18. The robot according to claim 17, wherein the at least one processor is further configured to:
  determine whether the robot is in an active state or an idle state;
  based on the robot being in the active state when text or voice of a first motion is output, skip the first motion; and
  based on the robot being in the idle state when text or voice of the first motion is output, control the at least one motor to drive the robot to perform the first motion.

19. The robot according to claim 17, wherein the at least one processor is further configured to:
  determine whether the robot is in an active state or an idle state;
  based on the robot being in the active state when text or voice of a first motion is output, store the first motion in the memory; and
  based on the robot being in the idle state when text or voice of the first motion is output, control the at least one motor to drive the robot to perform a first stored motion.

20. The robot according to claim 19, wherein the first stored motion is selected based on a predetermined criterion, and
  wherein the predetermined criterion corresponds to one of a motion identifier set based on an external input, a most obtained motion identifier, or a most recently stored motion identifier.

* * * * *